United States Patent [19]

Goettler et al.

[11] 4,056,591

[45] Nov. 1, 1977

[54] PROCESS FOR CONTROLLING ORIENTATION OF DISCONTINUOUS FIBER IN A FIBER-REINFORCED PRODUCT FORMED BY EXTRUSION

[75] Inventors: Lloyd A. Goettler; James Lambright, both of Akron, Ohio

[73] Assignee: Monsanto Company, St. Louis, Mo.

[21] Appl. No.: 654,547

[22] Filed: Feb. 2, 1976

Related U.S. Application Data

[63] Continuation of Ser. No. 428,219, Dec. 26, 1973, abandoned.

[51] Int. Cl.² ............................................. B29D 3/02
[52] U.S. Cl. ................................ 264/108; 264/177 R; 264/209; 428/36
[58] Field of Search .................. 264/108, 209, 177 R; 425/381.2, 207, 376, 206, 113; 428/36

[56] References Cited

U.S. PATENT DOCUMENTS

| | | | |
|---|---|---|---|
| 2,688,154 | 9/1954 | Huckfeldt | 425/381 |
| 3,296,346 | 1/1967 | Shannon | 264/108 |
| 3,327,038 | 6/1967 | Fox | 264/108 |
| 3,388,196 | 6/1968 | Farrell | 264/75 |
| 3,526,927 | 9/1970 | Villain | 264/108 |
| 3,592,882 | 7/1971 | Morifa | 264/108 |
| 3,651,187 | 3/1972 | Cessna | 264/108 |
| 3,748,074 | 7/1973 | Nitta et al. | 425/381.2 |

OTHER PUBLICATIONS

"Effects of Processing Techniques on Structure of Molded Parts", by W. Woeboken, Modern Plastics, pp. 146-154, 156, 158, 161 and 198, Dec. 1962.

*Primary Examiner*—Jay H. Woo

[57] ABSTRACT

A process for orienting discontinuous fiber in the matrix of an extrudate is described.

27 Claims, 6 Drawing Figures

PROCESS FOR CONTROLLING ORIENTATION OF DISCONTINUOUS FIBER IN A FIBER-REINFORCED PRODUCT FORMED BY EXTRUSION

This application is a continuation of Application Ser. No. 428,219, filed Dec. 26, 1973 now abandoned.

This invention relates to methods of orienting discontinuous fiber in a matrix by extrusion and especially to methods for orienting fiber from the axial direction, particularly in hose formed by extrusion, and to the resulting hose having fibers oriented therein.

BACKGROUND OF THE INVENTION

It is known that in a composite of fiber reinforced matrix having the fiber oriented in substantially a single direction, the strength and modulus of the composite is greater in the direction of orientation. It is also known that extruding a composite comprising a matrix and fiber tends to orient the fiber in the direction of flow, i.e., the fibers become oriented parallel to the axis of the extrudate. However, it is often desirable to produce extruded products having the fibers oriented in other directions than parallel to the axis of the extrudate. For example, because the bursting forces in a hose under pressure are greater around the circumference than along the axis, it is necessary that a hose possess adequate physical properties in the hoop direction for which purpose substantial orientation of the fiber in the hoop direction is desirable.

Hose and similar hollow or partially hollow articles are commonly formed by forcing a stream of plastic material over a mandrel of a die so as to divide and divert the stream into a channel formed between the mandrel and an outer die member. To obtain off-axis orientation, Donald U.S. Pat. No. 3,279,501, proposed forcing fiber and plastic matrix through a channel having parallel sides formed between concentric cylinders while rotating the cylinders. The rotation provided opposing helical patterns of fiber orientation in respect to the inner and outer surfaces of the tube. Improvements were achieved by Cessna, U.S. Pat. No. 3,651,187, through use of a conical rotating die. He pointed out that since the circumferential velocity changed as the distance from the rotating surfaces increased in the system suggested by Donald, the fibers were pulled into cylindrical surfaces of constant circumferential velocity but that, except at the forming surfaces, there was little off-axis orientation. By use of a conical rotating die, the circumferential velocity was made to vary longitudinally as well as radially. After being formed into cylindrical surfaces of constant circumferential velocity as before, the fiber in a given surface, if not perpendicular to the longitudinal axis of the channel, was subjected to varying circumferential speeds along its length so that the faster moving liquid tended to drag the fiber into its plane thereby orienting the fiber into a single longitudinal and annular plane. A further improvement suggested was to taper the sides of a diverging channel so that the outlet and inlet areas were substantially constant. Extending the length of the opening in the front of the extruder and simultaneously increasing the cross-sectional area of the opening, according to Parsons et al. U.S. Pat. No. 2,332,829, tends to turn particles more or less perpendicular to the axis of extrusion in a radial direction.

SUMMARY OF THE INVENTION

It has now been discovered that in dividing a mixture of fiber and matrix material and forcing it through a die channel which diverges from the axis of the die, improved circumferential properties result simply from substantially increasing the ratio of the outlet area to the inlet area. The extrudate will usually have an annular profile but may assume other shapes as for example, horseshoe-shaped. In general, the area at the outlet should be two or more times the area at the inlet. In case of a channel of constant width in the form of an annulus, increase in area inherently requires that the mean radius be increased in approximately the same proportion because in a die having constant channel width, $(A_o/A_i)$ is approximately equal to $(R_o/R_i)$ where $A_o$ and $A_i$ are the outlet area and the inlet area of the channel, respectively and $R_o$ and $R_i$ are the mean radii (distance from axis to center of channel) of the outlet and inlet of the channel, respectively. The proportion of fiber oriented in the hoop direction is then a function of the value either of $(A_o/A_i)$ or $(R_o/R_i)$. The inlet is considered to be the point immediately upstream from where the channel begins to diverge. Extrusion through a diverging channel of essentially constant channel width formed by stationary die members so that the outlet area is at least two or more times the inlet area of the die channel effects a substantial improvement in physical properties in the hoop direction.

A "diverging channel", as used herein, contemplates that both the inner and outer surfaces of the channel diverge from parallelism to the axis of symmetry of the die in such manner as to increase radius at the outlet. However, the two surfaces need not necessarily diverge to the same extent. Without significantly affecting the properties of the extrudate, the width of a diverging channel formed by surfaces of the inner and outer die members may vary somewhat from the inlet to the outlet of the die in which case the relationship between the average radius expansion and the area expansion, will, of course, vary. When a tapered diverging channel is used, different radial expansion may be required to obtain the same improvement in physical properties in the hoop direction as obtained from a diverging channel of uniform width. Orientation in the hoop direction can be achieved with area expansion somewhat lower than 2 if the radial expansion is sufficiently large. Conversely, a lower radial expansion requires a correspondingly greater area expansion. In particular, if $$\sqrt{\frac{A_o}{A_i} + \frac{R_o}{R_i}\left(\frac{A_o}{A_i} - 1\right)}$$

is equal to or greater than 2, substantial improvement in circumferential properties results. Desirably, the radius ratio is at least half the area ratio. As the change in channel thickness increases, a point may be reached, especially in channels of increasing thickness, at which flow is unstable and the channel does not fill uniformly. The taper should be confined within limits which provide stable flow of the particular fiber-matrix to be extruded.

Of course, it is understood that the orientation will vary somewhat depending upon factors other than die geometry. For example, such factors as fiber size, fiber loading, matrix viscosity and extrusion conditions, such as temperature and feed rate, will affect fiber orientation. An extrudate issuing from the die which retains its shape indicates that all these variables are within satisfactory limits. However, over wide ranges of fiber size, fiber loading, matrix properties and extrusion conditions, the channel geometry (i.e. the increase in area) is the dominant factor. Also, it is understood that the fiber orientation at the throat of the die may influence the orientation achieved as the composite passes through the die. Usually the orientation is axial at the throat. However, the process of the invention is applicable to other orientations at the throat and to randomly disposed fiber.

A wide range of channel widths is applicable for practice of the invention. Representative, but non-limiting, channel widths are about 1/32 inch to about ½ inch. Also, a wide range of diameters of the extrudate is applicable. Representative, but non-limiting, diameters are about ¼ inch to about 24 inches and larger, preferably about ½ inch to about 8 inches. The type of extruder does not appear to be significant, although a vented extruder is often advantageous.

The length of the channel along the axis of symmetry of the die from the inlet where the area expansion begins to the point where the area expansion ceases is variable. For example, the length may be several outlet diameters or may be essentially zero as in the case where the die channel turns radially from the die axis (perpendicular to the direction of extrusion) and then turns parallel to the axis after the desired area expansion is obtained. However, it will be appreciated that a lengthy channel increases the pressure drop through the die. The walls of the channel also tend to orient the fiber parallel to their surface, in the direction of extrusion. Generally, the angle formed by the die channel and the die axis is between 15°–90° with angles of about 45° to about 90° being preferred.

Any discontinuous fiber may be used. Fibers which reinforce matrices generally include fibers having an average aspect ratio of 10–3000 and more commonly are fibers having an average aspect ratio of 20–1000. A preferred aspect ratio is 20–350 with an aspect ratio of 50–200 being particularly desirable. Various types of organic and inorganic discontinuous fibers are suitable either in monofilament or stranded form (including bundles of fibers bonded together to make a single element which serves as a single fiber in the sense of orientation and reinforcement). Illustrative examples of satisfactory discontinuous fibers are nylon, rayon, polyester, cotton, wood cellulose, glass, carbon, steel, potassium titanate, boron, alumina and asbestos fibers.

The fiber loading is limited only by the workability of the mixture of fiber and matrix. The workable fiber concentration depends upon fiber aspect ratio, minimum clearance through the die and the viscoelastic properties of the matrix. The amount of fiber dispersed in the matrix is generally between 5–200 parts by weight per 100 parts by weight matrix with amounts of 10–75 parts by weight per 100 parts by weight matrix being preferred. Still more preferred are 10–40 parts by weight and 15–40 appears to be about optimum. The aforesaid fiber loading is calculated by considering all of the other ingredients of the composition (polymer, pigments, antioxidants, bonding agents, etc.) besides the fiber, as being the matrix and is not to be confused with fiber loading expressed in parts by weight per 100 parts by weight polymer which is often done for convenience in formulation. The proportions of the fiber will usually fall within the range of 20–150 parts expressed as parts by weight per hundred of polymer. Some synthetic rubber formulations normally contain much higher proportions of other ingredients than natural rubber formulations.

It should also be noted that the formation of hose from fiber reinforced matrix imparts significant manufacturing advantages because the reinforcement serves to sustain the shape of the extrudate and thereby avoid the necessity of applying air pressure or other means to maintain the form.

The method of the invention is applicable to any matrix material in which fibers can be dispersed. One class of suitable matrix materials is plastics, particularly thermoplastic polymers such as polyvinyl acetate, polyvinyl chloride, polyester polymers, for example poly(ethylene terephthalate), polyamides, for example, nylon, polyethylene, polypropylene, ethylene vinylacetate copolymer and ABS copolymers. Thermosetting plastics are also suitable, for example, phenolic resins such as phenolaldehyde resins. Inorganic matrix materials are also suitable, for example, cement or clay. A preferred class of matrix materials is elastomers, particularly sulfur-vulcanizable diene elastomers. Either natural or synthetic rubbers or mixtures thereof are satisfactory. Illustrative examples of suitable synthetic rubbers include cis-4-polybutadiene, butyl rubber, neoprene, ethylene propylene terpolymers, polymers of 1,3-butadiene, polymers of isoprene, and copolymers of 1,3-butadiene with other monomers, for example, styrene, acrylonitrile, isobutylene, and methylmethacrylate.

The matrix materials may, in addition to the fiber, contain other ingredients commonly found therein, and especially those ingredients necessary for achieving the desired properties of the composite composition. Such materials may include, for example, plasticizers, extender oils, antidegradants, reinforcing and non-reinforcing pigments such as zinc oxide, barium oxide, strontium oxide, iron oxide, silica, carbon black and organic pigments, bonding agents, vulcanizing agents such as sulfur, and vulcanization accelerators. Preferred elastomer compositions are wood cellulose fiber-elastomer composition described in U.S. Pat. No. 3,697,364 and discontinuous mixed fiber-elastomer compositions described in U.S. Pat. No. 3,709,845, both disclosures of which are incorporated herein by reference.

DETAILED DESCRIPTION

Figure 1:
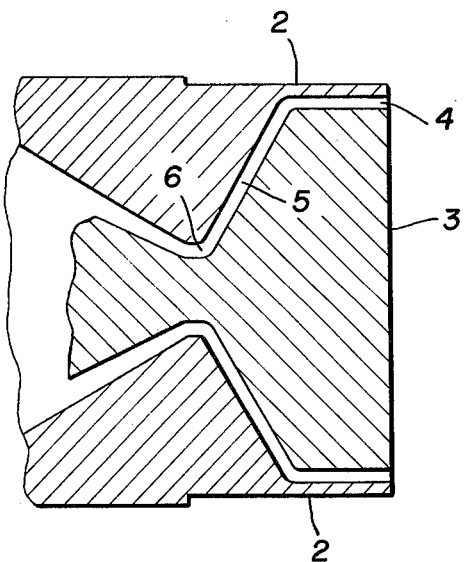
FIG. 1 is a side view of a section of a die cut along a plane through its axis which die has an annular inlet and a channel which diverges from the direction of extrusion.

Referring to FIG. 1, a typical die of the invention is illustrated comprising outer die member 2 and inner die member 3 which members are positioned to form channel 5 which diverges from the direction of extrusion. A matrix containing discontinuous fiber is fed through inlet 6 and an extrudate containing oriented fibers discharges from outlet 4. Since direction of extrusion is from left to right, the extrudate feed is constricted as it approaches inlet 6.

Figure 2:
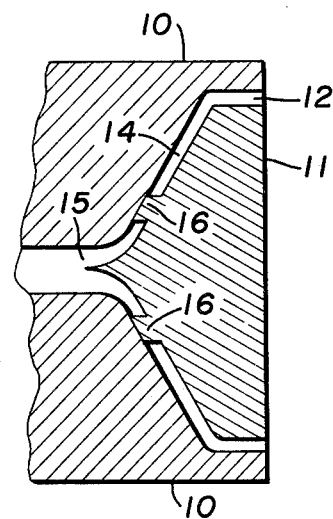
FIG. 2 is a side view of a section of a die cut along a plane through its axis which die has a cylindrical inlet and a channel which diverges from the direction of extrusion.

FIG. 2 shows a die comprising outer die member 10 and the inner die member 11 which member is supported by fastening means 16 which traverse channel 14 just downstream from inlet 15. Of course, it is understood that supporting means 16 takes up only a small area of channel 14 and is preferably streamlined to reduce any disruption of the flow of matrix through the channel. In this embodiment, the extrudate feed does not constrict as it approaches inlet 15 but divides as it is forced over the apex of inner die member 11. An extrudate containing oriented fibers discharges from outlet 12.

Figure 3:
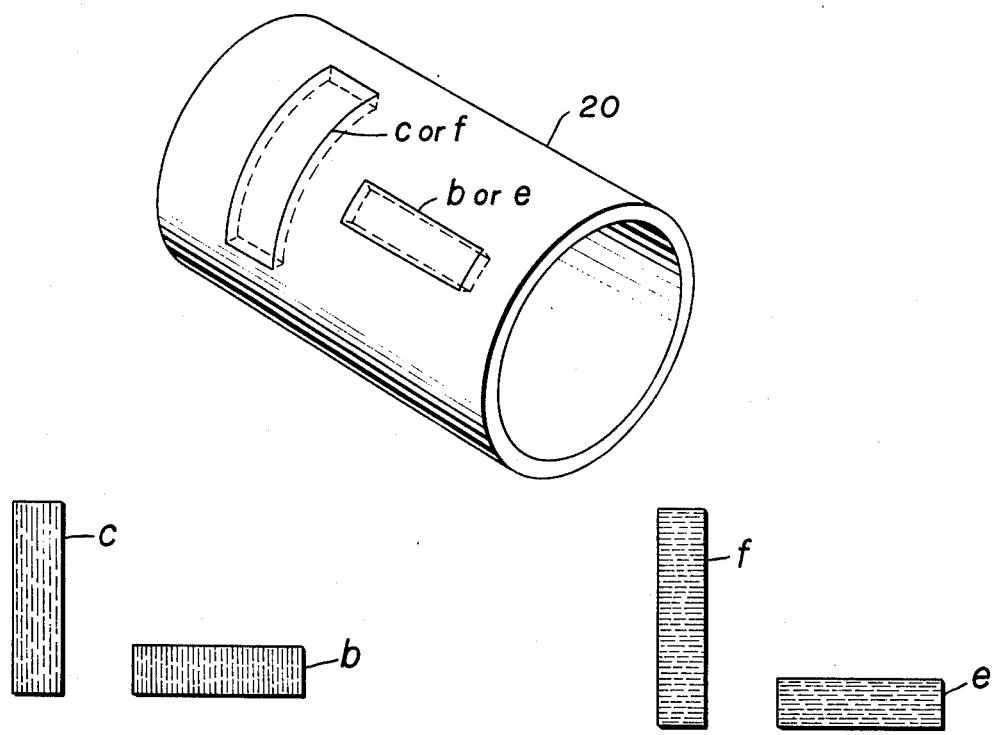
FIG. 3 is a graphic representation of a reinforced hose having fibers oriented therein and of section (b) or (e) of said hose cut parallel to the axis of the hose and sections (c) or (f) of said hoses cut circumferentially in respect to the axis of the hose.

Referring to FIG. 3, hose 20 containing cross sections $b$ and $c$ formed by extrusion of matrix containing discontinuous fiber through a typical die of the invention is illustrated. Section $b$ or $e$ is a section cut along the axis of the hose and section $c$ or $f$ is a section cut transverse to the axis of the hose. Sections $b$ and $c$ illustrate graphically sections from a hose having fibers oriented predominately in the hoop (circumferentially) direction. Sections $e$ and $f$ illustrate graphically sections from a hose having fiber oriented predominately in the axial (extrusion) direction. The anisotropy of sections $b$ and $c$ or $e$ and $f$ is a measure of fiber orientation of a hose.

Figure 4:
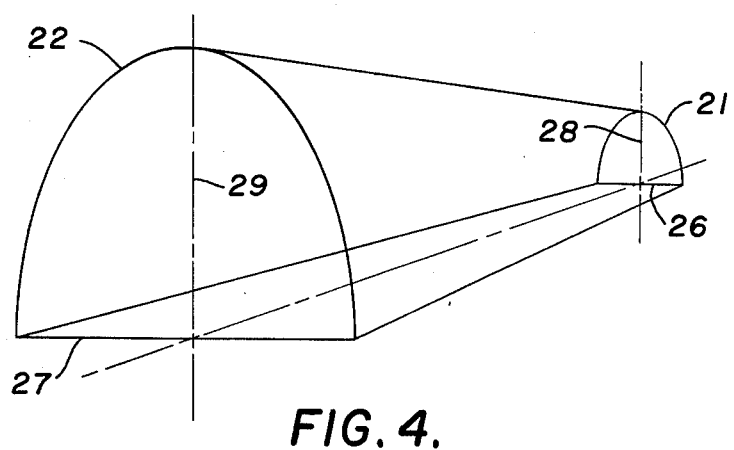
FIG. 4 is a graphic representation of an inner member of a die which forms a horseshoe-shaped channel.

FIG. 4 illustrates another embodiment of the invention which comprises controlling orientation of fiber by extrusion of a matrix containing discontinuous fiber through a horseshoe-shaped channel, and shows the profile of an inner die member. Profile 21 defines the inner wall of the inlet channel and profile 22 defines the inner wall of the outlet channel. The shape of profiles 21 and 22 is determined by the varying distances from the surface to the midpoint of the base. Lengths 26 and 27 illustrate the minimum distance to the inner wall at the inlet and outlet of the channel, respectively, and lengths 28 and 29 illustrate the maximum distance to the inner wall at the inlet and outlet of the channel, respectively. In the case of a channel of constant width, the outer wall of the channel comprises an outer die member having profiles similar to 21 and 22. Although profiles 21 and 22 as illustrated in FIG. 4 stop in the plane of radii 26 and 27, it is understood that the profiles may extend beyond the plane if desired, in order to make a die which will give extrudates of a different shape.

Figure 5:
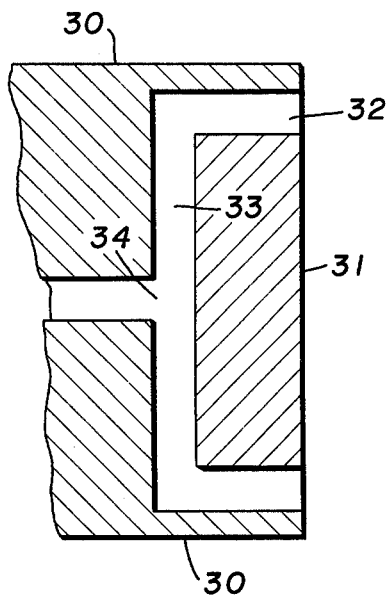
FIG. 5 is a side view of a section of a die cut along a plane through its axis which die has a cylindrical inlet and a channel which diverges radially from the direction of extrusion.

FIG. 5 illustrates another embodiment of the invention which comprises controlling orientation of fiber by forcing a matrix containing discontinuous fiber through a channel which diverges radially (perpendicular to the die axis) from the direction of extrusion. FIG. 5 shows a die comprising outer die member 30 and inner die member 31 which members are positioned to form channel 33 which diverges radially from the direction of extrusion. A matrix containing discontinuous fiber is fed through inlet 34 and an extrudate containing oriented fibers discharges from outlet 32. Assuming constant channel width, the amount of hoop orientation is controlled by varying the length of channel 33. Although this embodiment illustrates a cylindrical inlet through which the matrix is fed causing the material to divide as it is forced over inner member 31, it is understood that a portion of inner member 31 may extend through inlet 34 to support the mandrel. If the extension is cylindrical and concentric with the walls of the inlet, no constriction of the extrudate feed to the die occurs. On the other hand, the feed may pass through a constricting zone as shown in FIG. 1. Alternatively, the mandrel 31 may be supported as shown in FIG. 2. In still another embodiment, the extrudate at outlet 32 may be split by knives which also serve as support for the mandrel. It is preferred, however, that no support or other obstruction be located in the channel proper because some elastomeric stocks reknit with difficulty.

Figure 6:
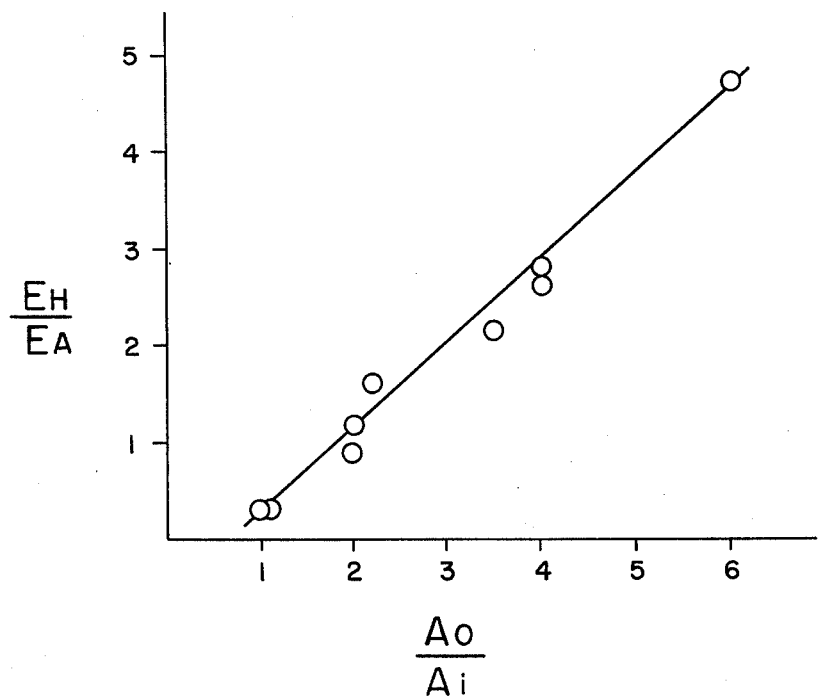
FIG. 6 is a graphic representation of the ratio of the Young's modulus of a hose in the hoop and longitudinal directions as a function of the ratio of the outlet and inlet areas of a die.

FIG. 6 demonstrates the relationship between the increase in area from the inlet to the outlet of the die and the anisotropy of the Young's modulus of a hose reinforced with 75 parts fiber per 100 parts elastomer produced by the process of the invention using a die having substantially constant width. The graph shows that the ratio of the Young's modulus in the hoop direction $E_H$ and Young's modulus in the axial direction $E_A$ is a function predominately of the ratio of the channel outlet area $A_o$ and channel inlet area $A_i$. The data indicate that the difference in modulus values in the two directions increases directly with the increase in area ratio.

The outlet area is the cross-sectional area of the extrudate neglecting swelling effects. The outlet area of an annular channel is the area of the circle formed by the surface of the wall of the outside die member at the outlet minus the area of the circle formed by the surface of the wall of the inside die member at the outlet. The inlet area of the channel is the area through which the extrudate passes immediately upstream from where the channel begins to diverge. In FIG. 2 the inlet area is formed by the surface of the wall of the outside die member and has its center at the apex of the cone comprising the inside die member. In FIG. 1 the inlet area is the inlet annulus formed between the wall of the outside die member and the wall of the inside die member at the point of minimum constriction. Since the amount of fiber orientation in the hoop direction is directly related to the area expansion from inlet to the outlet of the channel, it becomes a simple matter to construct a die with the desired area expansion to extrude a hose having any desired proportion of fibers oriented in the hoop direction.

In one embodiment of the invention, control of fiber orientation in a hose formed by extruding a matrix containing discontinuous fiber is achieved by means of a die having an annular channel of substantially constant width which channel diverges from the direction of extrusion such as to provide an outlet annulus area of two or more times the inlet area of the channel. When the area expansion through the die is about two, the stiffness in the hoop and longitudinal directions is about equal. When the area expansion through the die is three or more, the stiffness in the hoop direction is about two or more times the stiffness in the longitudinal direction. Thus, passage of a matrix containing discontinuous fibers through said annular channel of about constant width having an outlet area of about double the inlet area gives an extrudate in which about equal amounts of fiber are oriented in both the hoop and longitudinal (extrusion) directions. Passage of a matrix containing discontinuous fiber of the same fiber loading through a similar channel of about constant width but having an outlet area of about three or more times the inlet area gives an extrudate in which the amount of fiber oriented in the hoop direction is greater than the amount of fiber in the longitudinal direction. Passage of a matrix through a similar channel of about constant channel width but having even greater area expansion gives an extrudate having even higher amounts of fiber oriented hoop-wise. In all of these embodiments, the flow is stable.

It is observed that the orientation of fiber is substantially uniform around the circumference of a hose formed by forcing a matrix containing discontinuous fiber through the channel formed by a conical die which provides an area expansion sufficient for significant hoop orientation. Similarly, a symmetrical oval channel of constant width provides uniform fiber orientation around its periphery. If the shape changes from the inlet to the outlet or if the inlet and outlet are not concentric, fiber orientation will differ around the circumference of the hose.

Extrudates comprising vulcanizable elastomer matrix are cured by conventional procedures while extrudates comprising thermoplastic matrix require no curing and develop superior physical properties merely upon cooling. In one embodiment of the invention the extrudate is continuously cured by operating the extruder in tandem with a microwave curing unit which unit generally comprises a microwave oven and a hot-air oven or liquid cure medium. Continuous curing is particularly useful for making hose of indefinite length.

In another embodiment of the invention, fiber orientation in an extrudate having a horseshoe-shaped profile is controlled by varying the amount the channel expands in any particular section of the extrudate profile. For example, considering the horseshoe-shaped extrudate as being a cross section of a pneumatic tire, if uniform orientation of fiber around the contour of the horseshoe is desired, then the area expansion is held constant along the contour. If different degrees of fiber orientation around the contour are desired, for example, greater hoop orientation in the sidewalls than in the crown, then a greater area expansion in the portions of the channel which forms the sidewalls is provided.

Obviously, a horseshoe-shaped extrudate may be flattened to form a sheet of fiber-reinforced material having the fibers oriented in the desired direction or, in the case of a hose, the hose may be split and laid flat to form a sheet. By the process of this invention, fiber-reinforced sheets are obtained having a greater proportion of fibers oriented transverse to the length of the sheet than obtained by previous extrusion processes or sheets are obtained with various amounts of fibers oriented in the transverse direction at different sites across the width of the sheet which kind of orientation heretofore has not been obtained by extrusion techniques. Sections of oriented fiber reinforced sheets obtained by the process of this invention are useful as reinforcing belt ply members, such as in the manufacture of pneumatic tires or power transmission belts, for example as a ply under the continuous cord ply of a V-belt.

Physical properties of an extrudate are determined by standard methods of measuring stress-strain properties in pounds per square inch with a tensile tester following ASTM D-638 procedures. Tensile strength, modulus and percent elongation of test specimens are calculated from the stress-strain data. Fiber orientation of a sample of an extrudate is determined by dieing test specimens in both the longitudinal (extrusion) and circumferential (hoop) directions and measuring the physical properties by the above-described method. The ratio of the physical properties of the specimen in the hoop direction to the physical properties of the specimen in the longitudinal direction indicates relative fiber orientation. For example, a ratio of one in Young's modulus of the sample is taken to indicate that equal amounts of fiber are oriented in both directions. When more fibers are oriented in the hoop direction, the ratio of Young's modulus of the samples is greater than one and proportionally larger depending upon the number of fibers oriented in that particular direction. For the sake of simplicity, fiber orientation is discussed in terms of the direction of the fiber in respect to the axial and circumferential directions of the hose, however, it is understood that certain fibers are oriented at various angles in respect to the axis and that fiber orientation based upon modulus measurements includes the contribution from those fibers disposed at an angle in respect to the direction of measurement.

DESCRIPTION OF PREFERRED EMBODIMENTS

To illustrate the invention, a composite comprising cellulose fiber and vulcanizable rubber composition is extruded by a Royle extruder through dies having constant channel width but having different area expansions to form 1.5 inches OD hose having about 70 mil wall thickness. The extrudate is cut to provide hoses of any desired length. The uncured hose are vulcanized either in an autoclave or in a mold. When making shaped hose, such as radiator hose, vulcanization in a mold is preferred. Shaping of the hose by curing in a mold does not significantly affect fiber orientation.

The composite feed material is prepared by incorporating 75 parts of wood cellulose fiber treated to reduce fiber-to-fiber interaction per 100 parts of elastomer into the following rubber composition which includes bonding ingredients.

|  | Parts by Weight |
|---|---|
| Styrene-butadiene rubber | 50 |
| Natural rubber | 50 |
| FEF carbon black | 50 |
| Silica | 5 |
| Zinc oxide | 3 |
| Stearic Acid | 2 |
| Phenylenediamine antidegradant | 2 |
| Alkylene resorcinol-polymer | 5 |
| Hexamethoxymethylmelamine | 2 |
| Processing oil | 20 |
| Sulfur | 2 |
| Sulfenamide accelerator | 1 |
| TOTAL | 912 |

The composite is extruded through dies designed according to FIG. 1. The dies have constant channel width of 0.07 inches, land length of 0.45 inches and the following indicated dimensions (all dimensions in inches). The channel diverges from the axis by an angle of about 60°. The area ratio is the ratio of the area of the outlet orifice divided by the area of the inlet orifice.

| Die No. | Inside Die Member Diameter Inlet | Inside Die Member Diameter Outlet | Outside Die Member Diameter Inlet | Outside Die Member Diameter OUtlet | $A_o/A_i$ |
|---|---|---|---|---|---|
| B-19 | 1.36 | 1.36 | 1.50 | 1.50 | 1 |
| B-18 | 0.64 | 1.36 | 0.785 | 1.50 | 2 |
| B-9 | 0.288 | 1.36 | 0.428 | 1.50 | 4 |
| B-39 | 0.168 | 1.36 | 0.308 | 1.50 | 6 |

The extruder operating conditions are: Barrel temperature about 100°–125° F, screw speed about 45 rpm, head temperature about 150°–160° F, and feed rate about 400–500 grams per minute (about 5–10 feet/min.). The extrudate issues from the die at a temperature of about 140°–160° F and has sufficient strength to retain its shape. Sections of the uncured hoses are vulcanized by heating at about 320° F for 42–60 minutes in an autoclave. Physical properties of the cured hoses are determined as previously described. The average values of ultimate tensile strength, Young's modulus and ultimate elongation obtained on a number of samples extruded with each die are listed below.

| Die No. | Hoop UTS | Hoop E | Hoop $\epsilon_u$ | Axial UTS | Axial E | Axial $\epsilon_u$ | Anisotropy Ratio $E_H/E_A$ | $A_o/A_i$ |
|---|---|---|---|---|---|---|---|---|
| B-19 | 820 | 3940 | 35 | 1210 | 11910 | 20 | 0.3 | 1 |
| B-18 | 1100 | 5630 | 35 | 840 | 5970 | 31 | 0.9 | 2 |
| B-9 | 1130 | 7260 | 28 | 540 | 2550 | 65 | 2.8 | 4 |
| B-39 | 1860 | 16560 | 19 | 720 | 3510 | 55 | 4.7 | 6 |

The data show that the amount of fiber orientation in the hoop direction directly increases with the area ratio.

Several hoses are prepared using the B-9 die having the 4:1 area expansion and a similar rubber composition as above. The amount of wood cellulose fiber in the composite is varied. The extruder operating conditions are: Screw speed about 30 rpm, barrel temperature about 145° F, temperature of extrudate issuing from the die 167°–185° F, and composite feed rate of about 300 grams per minute except for the low fiber loading sample which feed rate is about 540 grams per minute. The amount of wood cellulose fiber is given in parts per hundred parts elastomer. The hoses are vulcanized in an autoclave as before. The physical properties are listed below.

| Fiber Loading | Hoop UTS | Hoop E | Hoop $\epsilon_u$ | Axial UTS | Axial E | Axial $\epsilon_u$ | Anisotropy Ratio $E_H/E_A$ |
|---|---|---|---|---|---|---|---|
| 25 | 1230 | 1990 | 130 | 860 | 1520 | 127 | 1.3 |
| 75 | 1660 | 8400 | 47 | 800 | 3180 | 57 | 2.6 |
| 125 | 1590 | 13670 | 18 | 670 | 4750 | 36 | 2.9 |

The data show that fiber orientation in the hoop direction is influenced by fiber loading, the hoop orientation increasing with higher loading. Even at the lowest loading the majority of the fiber is oriented in the hoop direction. If more hoop orientation is desired with the lower loading, a die having a greater area expansion is required.

Several hoses are prepared using the B-9 die and the above rubber composition containing 75 parts wood cellulose fiber per 100 parts elastomer while varying extruder temperatures and feed rates to illustrate their effects on fiber orientation. The uncured hoses are vulcanized as before.

| Sample | Screw Speed,rpm | Screw outlet Temp.,° F | Extrudate Temp.,° F | Feed Rate grams/min. | Anisotropy Ratio $E_H/E_A$ |
|---|---|---|---|---|---|
| 1 | 30 | 149 | 167 | 301 | 2.6 |
| 2 | 45 | 153 | 174 | 400 | 2.6 |
| 3 | 60 | 153 | 189 | 468 | 2.7 |
| 4 | 30 | 257 | 181 | 155 | 2.9 |
| 5 | 45 | 253 | 190 | 219 | 3.0 |
| 6 | 60 | 253 | 201 | 289 | 3.2 |

The data show that screw speed, feed rate and temperature can be varied over wide limits without affecting fiber orientation significantly.

To illustrate the invention with a composite comprising a thermoplastic matrix, a composite is prepared by mixing the following components in a Banbury mixer at a temperature high enough to melt the thermoplastic.

| | Parts by weight |
|---|---|
| Polyvinyl Chloride Homopolymer | 100.0 |
| Plasticizer (Santicizer 711) | 48.8 |
| Epoxidized soya oil | 3.5 |
| Ba/Cd stabilizer | 1.4 |
| Calcium carbonate | 20.8 |
| Hardwood dry lap pulp | 62.0 |
| Total | 236.5 |

The composite is extruded by a Royle extruder through Die No. B-20, a die of constant channel width with $(A_o/A_i) = 4$ and having the same dimensions as Die No. B-9 except for a longer land length of 0.825 inch. The extruder operating conditions are: Barrel temperature about 380° F, head temperature about 420° F and extrudate temperature about 320° F. The extrudate issuing from the die has a smooth surface and sufficient strength to maintain its profile. Upon cooling, a rigid fiber-reinforced pipe is obtained. Sections of the pipe are slit, pulled open and made into a sheet by applying heat and pressure but without distorting the dimensions of the section. Test specimens are died from the sheets in both the longitudinal and circumferential directions. The physical properties of said test specimens are:

| Hoop | | | Axial | | | Anisotropy Ratio |
|---|---|---|---|---|---|---|
| UTS | E | $\epsilon_u$ | UTS | E | $\epsilon_u$ | $E_H/E_A$ |
| 1810 | 23000 | 15 | 1050 | 9310 | 25 | 2.5 |

Several hoses are prepared by extruding a composite comprising the above rubber composition containing 75 parts of wood cellulose fiber per 100 parts elastomer through dies of the design of FIG. 1 having diverging channels but with converging walls, i.e., the channel width decreases in the diverging channel section as it approaches the outlet. Thus the angle of the inside wall is 60° as before but the angle of the outside wall is 54.5°. The dies have an outlet orifice width of 0.07 inches, land length of 0.45 inches and the following inlet and outlet dimensions. The width between the die members remains constant through the land length.

| Die No. | Inside Die Member Diameter | | Outside Die Member Diameter | | $A_o/A_i$ |
|---|---|---|---|---|---|
| | Inlet | Outlet | Inlet | Outlet | |
| B-29 | 0.575 | 1.36 | 0.825 | 1.50 | 1.1 |
| B-30 | 0.232 | 1.36 | 0.486 | 1.50 | 2.2 |

Screw speed is 30 rpm and the hoses are cured as above. The physical properties are shown in the table.

| Die No. | $A_o/A_i$ | Hoop | | Axial | | Anisotropy Ratio |
|---|---|---|---|---|---|---|
| | | UTS | E | UTS | E | $E_H/E_A$ |
| B-29 | 1.1 | 400 | 1200 | 640 | 3560 | 0.3 |
| B-30 | 2.2 | 1580 | 7880 | 1030 | 4950 | 1.6 |

The data demonstrate that area expansion of 2.2 is sufficient to orient the major portion of the fiber in the hoop direction.

A three-inch O. D. hose having about 70 mil wall thickness and about equal amounts of fiber oriented in the axial and hoop directions is prepared by extruding a composite composition containing 75 parts wood cellulose fiber using a 3½ inch MONSANTO extruder through a die of the indicated dimensions.

| Die No. | Inside Die Member Diameter | | Outside Die Member Diameter | | $A_o/A_i$ |
|---|---|---|---|---|---|
| | Inlet | Outlet | Inlet | Outlet | |
| B-23 | 1.394 | 2.86 | 1.535 | 3.0 | 2 |

The uncured hose is steam cured at 320° for 20 minutes to give the following properties:

| Hoop | | | Axial | | | Anisotropy Ratio |
|---|---|---|---|---|---|---|
| UTS | E | $\epsilon_u$ | UTS | E | $\epsilon_u$ | $E_H/E_A$ |
| 1000 | 4740 | 36 | 630 | 3890 | 40 | 1.2 |

A number of ¾ inch I. D. hose having about 100 mil wall thickness are prepared by extruding various composite compositions, using a 3½ inch MONSANTO extruder, through a die having constant channel width and an area expansion of 3.5. The hoses are vulcanized in an autoclave for the times indicated by Rheometer data to obtain optimum cure.

| Elastomer Type | Cellulose Fiber Loading, phr | Hoop | | | Axial | | | Anisotropy Ratio |
|---|---|---|---|---|---|---|---|---|
| | | UTS | E | $\epsilon_u$ | UTS | E | $\epsilon_u$ | $E_H/E_A$ |
| Natural-SBR blend | 75 | 1020 | 5140 | 36 | 590 | 2270 | 65 | 2.3 |
| EPDM Rubber | 75 | 1110 | 4120 | 48 | 770 | 2060 | 66 | 2.0 |
| Styrene-butadiene rubber | 40 | 1170 | 3370 | 70 | 720 | 1960 | 95 | 1.7 |

The above-described hoses, subjected to pneumatic pressure, burst at about 200 pounds per square inch pressure.

Hoses of improved hoop properties are also prepared from the afore-described rubber composition containing 75 parts of wood cellulose fiber per 100 parts of elastomer using a die similar to the one illustrated in FIG. 1 but with diverging walls, i.e. the channel width in the expanding section increases as it approaches the outlet and then remains constant through the land. Thus, the angle of the outside wall is 60° from the die axis and the angle of the inside wall is 56.5°. At the outlet, the diameter of the inside die member is 1.36 inches and the diameter of the outside die member is 1.50 inches giving an orifice width of 0.07 inch. At the inlet, the diameter of the inside die member is 0.322 inch and the diameter of the outside die member is 0.393 inch giving an orifice width of 0.35 inch. Thus, $(A_o/A_i) = 8$, $(R_o/R_i) = 4$ and the ratio of orifice width at the outlet to orifice width of the inlet is 2.

In another embodiment of a die similar in design to FIG. 1 but again having tapered channel walls, the angle of the outside channel wall is 60° from the die axis and the angle of the inside wall is 54° 15′ from the die axis. At the outlet, the diameter of the inside die member is 1.36 inches and the diameter of the outside die member is 1.50 inches giving a channel width at the outlet of 0.07 inch. At the inlet, the diameter of the inside die member is 0.680 inch and the diameter of the outside die member is 0.750 inch giving a channel width at the inlet of 0.035 inch. Thus, in the aforesaid die identified as B-62, $(R_o/R_i) = 2$, $(A_o/A_i) = 4$ and the ratio of the channel width at the outlet to the channel width at the inlet is 2. The land length is 0.420 inch. The afore-described rubber composition containing 75 parts of wood cellulose fiber per 100 parts of elastomer is forced through the channel by means of a rubber extruder operated at a barrel temperature of 175° F and 30–60 rpm. The temperature of the inner die member and the extrudate is 176° F and the temperature of the outer die member is 194° F. The extruded hose is cured by heating 30 minutes at 320° F in steam to give the following properties.

| Hoop | | | Axial | | | Anisotropy Ratio |
|---|---|---|---|---|---|---|
| UTS | E | $\epsilon_u$ | UTS | E | $\epsilon_u$ | $E_H/E_A$ |
| 1200 | 4440 | 49% | 640 | 2540 | 128% | 1.75 |

A ¾ inch ID hose of indefinite length having about 165 mil wall thickness is prepared by extruding a sulfur vulcanizable elastomer composite comprising EPDM rubber containing 75 parts hardwood cellulose fiber per 100 parts rubber, using a 3½ inches MONSANTO extruder, through a die having constant channel width and $(A_o/A_i) = 3.5$. Because the presence of water is detrimental to curing at low pressure and high temperature, such as microwave curing, the composite feed material is well dried prior to extrusion. The uncured hose containing fiber oriented in the hoop direction is continuously fed as it issues from the die directly into a microwave curing unit. The microwave curing unit is operated so that the extrudate is at about 300°–450° F, preferably at about 360°–400° F with a total residence time in the microwave oven and post cure unit of about 1–5 minutes, preferably between 1–3 minutes. A vulcanized reinforced hose exits from the unit. A section of said hose subjected to pneumatic pressure bursts at about 280 psi.

A composite comprising natural rubber-SBR blend and 75 parts of wood cellulose fiber is extruded through die D-13 having a radially diverging channel as illustrated in FIG. 5. A rod extends from the inner member through the opening in the outer member of the die to support the mandrel and forms an annular inlet. The inlet annulus has an inner diameter of 0.288 inches and an outer diameter of 0.428 inches. The outlet annulus has an inner diameter of 1.36 inches and an outer diameter of 1.50 inches. In addition, the sharp corners formed by the diverging channel and the land portion of the die as illustrated in FIG. 5 are eliminated in die D-13 by machining the surfaces joining the diverging and land portions of the channel in the form of a smooth arc. The radius of the arc of the inner die member is 0.03 inches and the radius of the arc of the outer die member is one-tenth inch giving a constant channel width of 0.07 inches throughout. The hoses are vulcanized in an autoclave as before. The average values of physical properties obtained on a number of hoses are listed below.

| Die No. | $\dfrac{A_o}{A_i}$ | Hoop | | | Axial | | | Anisotropy Ratio |
|---|---|---|---|---|---|---|---|---|
| | | UTS | E | $\epsilon_u$ | UTS | E | $\epsilon_u$ | $E_H/E_A$ |
| D-13 | 4 | 1600 | 8290 | 33 | 750 | 2780 | 70 | 3.0 |

A number of 1.5 inches OD hoses having about 70 mil wall thickness are prepared by extruding composite comprising natural rubber-SBR blend and 75 parts rayon fiber of various lengths through dies with constant channel width and an area expansion of 4. The diameter of the rayon fibers is about 10–15 microns. The fiber lengths shown below are the initial lengths of fiber used to prepare the composite, however, some comminution of the fiber occurred while preparing the composite. The hoses are vulcanized in an autoclave and the physical properties measured.

| Die No. | $\dfrac{A_o}{A_i}$ | Rayon fiber length, inches | Hoop | | | Axial | | | $\dfrac{E_H}{E_A}$ |
|---|---|---|---|---|---|---|---|---|---|
| | | | UTS | E | $\epsilon_u$ | UTS | E | $\epsilon_u$ | |
| B-9 | 4 | 0.125 | 1330 | 9380 | 27 | 790 | 2510 | 69 | 3.7 |
| B-20 | 4 | 0.25 | 1510 | 8400 | 29 | 770 | 2690 | 71 | 3.1 |
| B-20 | 4 | 0.5 | 1670 | 9660 | 28 | 700 | 2540 | 63 | 3.8 |

The fiber is preferably pretreated to reduce fiber to fiber interaction, which pretreatment is especially important in the case of unregenerated cellulose wood fiber. Suitable pretreatments include slurrying the fiber in water with carbon black or slurrying it in water with rubber latex. Simply stirring is sufficient at least with hardwood fiber and styrene-butadiene copolymer rubber, but it may be necessary to induce coagulation of the rubber on the fiber.

The fibers for making the composite are pretreated to reduce fiber to fiber interactions and to reduce fiber breakage during incorporation into the rubber matrix by slurrying in water and treating with latex. To 10 parts by weight of cellulose fibers slurried in 500 parts by weight of water for three minutes at high speed in a Waring Blendor add 40 parts by weight of 25% styrene-butadiene copolymer latex (SBR 1502) and 0.4 part by weight of water insoluble rubber antidegradant (N-(1,3-dimethylbutyl)-N'-phenyl-p-phenylenediamine) and mix 7 minutes at low speed. The rubber coagulates on the fiber during the mixing. The treated fiber, which is now coated with rubber and antidegradant is filtered, allowed to dry, and weighed. The fiber now contains 5.0 parts by weight of rubber and 0.4 part by weight of antidegradant. It is mixed for two minutes in a Brabender mixer set at 45° C. and 50 revolutions per minute with natural rubber which has been previously broken down on a rubber mill. Carbon black, curing ingredients and fiber bonding ingredients are added and mixed for two minutes to prepare a vulcanizable composition of the aforesaid ingredients and proportions.

Although the invention has been illustrated by typical examples, it is not limited thereto. For example, the process of this invention is applicable to more complex extrusion systems, such as cross-head extruders wherein two hoses are simultaneously extruded and one hose envelopes the other. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. In the process for the off-axis orientation of fiber in a matrix by dividing a mixture of organic polymer and discontinuous fiber and extruding it through a die channel having inner and outer surfaces and intervening space substantially filled by the mixture, the improvement which comprises effecting off-axis orientation primarily by having said inner and outer surfaces diverge from the axis of the die such that the distance of each surface from said axis is greater at the channel outlet than at the channel inlet and ($A_o/A_i$) is 2 or more where $A_o$ is the channel outlet area and $A_i$ is the channel inlet area, said inner and outer surfaces being substantially stationary.

2. The process of claim 1 wherein said inner and outer surfaces terminate in a land portion of the die in which the surfaces extend substantially parallel to the die axis and the matrix is an elastomer.

3. The process of claim 1 in which said inner and outer surfaces terminate in a land portion of the die wherein the surfaces extend substantially parallel to the die axis for a distance at least six times the channel width, the channel is of substantially constant width and ($A_o/A_i$) is 3 or more.

4. The process of claim 1 in which the fiber is unregenerated wood cellulose treated to reduce fiber to fiber interaction, the wood cellulose being the major proportion of the treated fiber, the treated fiber having an average aspect ratio within the range of 50–200.

5. The process of claim 4 in which the organic polymer of the mixture is sulfur vulcanizable elastomer and said inner and outer surfaces terminate in a land portion of the die wherein the surfaces extend substantially parallel to the die axis.

6. The process of claim 1 in which the fiber is organic fiber having an average aspect ratio of 20–1000 and the amount of fiber is 10–75 parts by weight per 100 parts by weight matrix.

7. The process of claim 1 in which the fiber is inorganic fiber having an average aspect ratio of 20–1000 and the amount of fiber is 10–75 parts by weight per 100 parts by weight matrix.

8. In the process for the off-axis orientation of fiber in a matrix to form a fiber-reinforced extrudate by forcing an organic polymer matrix containing discontinuous fiber through a die channel having an oval, annular, or horseshoe-shaped orifice which channel is formed between surfaces of a central mandrel and an outer die member and has the intervening space substantially filled with said matrix and fiber, the improvement which comprises effecting off-axis orientation primarily by having said inner and outer surfaces diverge from the axis of the die such that the distance of each surface from the axis is greater at the channel outlet than at the channel inlet and the channel area at the outlet is at least twice the channel area at the inlet, said inner and outer surfaces being substantially stationary.

9. The process of claim 8 in which the channel is annular of substantially constant width and said inner and outer surfaces terminate in a land portion of the die wherein the surfaces extend substantially parallel to the die axis.

10. The process of claim 8 in which the fiber is unregenerated wood cellulose treated to reduce fiber to fiber interaction, the wood cellulose being the major proportion of the treated fiber, the average aspect ratio of the treated fiber being within the range of 50–200.

11. The process of claim 10 in which the organic polymer of the matrix is sulfur vulcanizable elastomer and said inner and outer surfaces terminate in a land portion of the die wherein the surfaces extend substantially parallel to the die axis.

12. The process of claim 11 in which the extrudate is cured by passing it through a continuous curing unit.

13. The process of claim 11 in which the channel area at the outlet is 3 or more times the channel area at the inlet.

14. The process of claim 11 in which the channel is oval.

15. The process of claim 11 in which the channel is horseshoe-shaped.

16. The process of claim 11 in which natural or synthetic rubber is the adjuvant with which the fiber is treated to reduce fiber to fiber interaction.

17. The process of claim 16 in which the channel area at the outlet is 3 or more times the channel area at the inlet.

18. A process for off-axis orienting fiber in an organic polymer matrix which comprises substantially filling a diverging annular channel characterized by being formed between substantially stationary surfaces having an outlet annulus area two or more times the inlet area and a radius ratio at least half the area ratio with a composite of organic polymer matrix and discontinuous fiber, extruding the composite through the channel and effecting off-axis orientation primarily by said channel characteristics.

19. A process for preparing fiber-reinforced hose having about equal moduli in the circumferential and longitudinal directions which comprises extruding an organic polymer matrix containing discontinuous reinforcing fibers through substantially stationary die members forming a diverging annular channel of substantially constant width having an area expansion from the inlet to the outlet of the channel of about 2, such channel being substantially filled by said matrix and fiber.

20. A process for preparing fiber-reinforced hose having a modulus in the circumferential direction greater than the modulus in the longitudinal direction which comprises extruding an organic polymer matrix containing discontinuous reinforcing fibers through a diverging annular channel characterized by substantially constant width, formed between substantially stationary surfaces which diverge from a central axis then terminate in a section substantially parallel to the central axis for a distance at least six times the channel width, an area expansion from the inlet to the outlet of the channel of at least about 3, substantially filled by the matrix and fiber, and forming hose having such modulus primarily by such channel characteristics.

21. The process of claim 20 in which the fiber is unregenerated wood cellulose treated to reduce fiber to fiber interaction, the wood cellulose being the major proportion of the treated fiber, the treated fiber having an average aspect ratio of 50–200 and being present in amount of 10–75 parts by weight per 100 parts by weight matrix.

22. The process of claim 21 in which the treating adjuvant for the wood cellulose is natural or synthetic rubber.

23. A process for the off-axis orientation of fiber in a matrix which comprises substantially filling with a mixture of elastomer and discontinuous fiber the channel of a die characterized by having substantially stationary inner and outer die members which form an annular channel which diverges from the axis of symmetry of the die then terminates in a land section extending substantially parallel to said axis and by having $$\sqrt{\frac{A_o}{A_i} + \frac{R_o}{R_i}\left(\frac{A_o}{A_i} - 1\right)}$$

equal to two or more in which $A_o$ is the channel outlet area, $A_i$ is the channel inlet area, $R_o$ is the channel outlet mean radius and $R_i$ is the channel inlet mean radius, and extruding the mixture through the die, the off-axis orientation being obtained primarily by such characteristics.

24. The process of claim 23 wherein the fiber is unregenerated wood cellulose treated to reduce fiber to fiber interaction, the wood cellulose being the major proportion of the treated fiber, the treated fiber having an average aspect ratio within the range of 50–200.

25. The process of claim 24 wherein the radius ratio is at least half the area ratio.

26. The process of claim 23 in which the fiber is organic fiber having an average aspect ratio of 20–1000 and the amount of fiber is 10–75 parts by weight per 100 parts by weight maxtix.

27. The process of claim 23 in which the fiber is inorganic fiber having an average aspect ratio of 20–1000 and the amount of fiber is 10–75 parts by weight per 100 parts by weight matrix.

* * * * *